United States Patent
Shi et al.

(10) Patent No.: US 8,893,376 B1
(45) Date of Patent: Nov. 25, 2014

(54) METHOD OF FORMING A STRAIGHT TOP MAIN POLE FOR PMR BEVEL WRITER

(75) Inventors: Changqing Shi, San Ramon, CA (US); Ming Jiang, San Jose, CA (US)

(73) Assignee: Western Digital(Fremont), LLC, Fremont, CA (US)

( * ) Notice: Subject to any disclaimer, the term of this patent is extended or adjusted under 35 U.S.C. 154(b) by 135 days.

(21) Appl. No.: 13/568,685

(22) Filed: Aug. 7, 2012

Related U.S. Application Data

(62) Division of application No. 12/426,134, filed on Apr. 17, 2009, now Pat. No. 8,254,060.

(51) Int. Cl.
  *G11B 5/127* (2006.01)
  *H04R 31/00* (2006.01)

(52) U.S. Cl.
  USPC .................. 29/603.16; 29/603.13; 29/603.14; 29/603.15; 29/603.18; 216/62; 216/65; 216/66; 360/121; 360/122; 360/317

(58) Field of Classification Search
  USPC ............... 29/603.11, 603.13–603.16, 603.18; 216/62, 65, 66; 360/121, 122, 317
  See application file for complete search history.

(56) References Cited

U.S. PATENT DOCUMENTS

| | | | |
|---|---|---|---|
| 4,671,849 A | 6/1987 | Chen et al. | |
| 5,075,956 A | 12/1991 | Das | |
| 5,664,316 A | 9/1997 | Chen et al. | |
| 6,172,848 B1 | 1/2001 | Santini | |
| 6,261,967 B1 | 7/2001 | Athavale et al. | |
| 6,369,984 B1 | 4/2002 | Sato | |
| 6,564,445 B1 | 5/2003 | Hashimoto et al. | |
| 6,722,018 B2 | 4/2004 | Santini | |
| 6,731,460 B2 | 5/2004 | Sasaki | |
| 6,762,911 B2 | 7/2004 | Sasaki et al. | |
| 6,783,874 B2 | 8/2004 | Hasegawa et al. | |
| 6,813,116 B2 | 11/2004 | Nakamura et al. | |
| 6,857,181 B2 | 2/2005 | Lo et al. | |
| 6,862,798 B2 | 3/2005 | Kruger et al. | |
| 6,870,712 B2 | 3/2005 | Chen et al. | |
| 6,891,697 B2 | 5/2005 | Nakamura et al. | |
| 6,903,900 B2 | 6/2005 | Sato et al. | |
| 6,912,106 B1 | 6/2005 | Chen et al. | |
| 6,947,255 B2 | 9/2005 | Hsiao et al. | |
| 6,949,833 B2 | 9/2005 | O'Kane et al. | |
| 6,950,277 B1 | 9/2005 | Nguy et al. | |
| 6,952,325 B2 | 10/2005 | Sato et al. | |
| 6,975,486 B2 | 12/2005 | Chen et al. | |
| 6,989,972 B1 | 1/2006 | Stoev et al. | |
| 6,995,949 B2 | 2/2006 | Nakamura et al. | |

(Continued)

FOREIGN PATENT DOCUMENTS

EP    0823726 A1    2/1998

OTHER PUBLICATIONS

Office Action dated Dec. 6, 2011 from U.S. Appl. No. 12/426,134, 28 pages.

(Continued)

*Primary Examiner* — Paul D Kim

(57) ABSTRACT

A method of forming a magnetic recording head is provided. The method comprises the steps of forming a damascene trench comprising a lower region having a substantially trapezoidal cross-section and an upper region having a substantially rectangular cross-section, and providing a magnetic material within the damascene trench.

10 Claims, 6 Drawing Sheets

(56) References Cited

U.S. PATENT DOCUMENTS

| | | | |
|---|---|---|---|
| 7,006,326 B2 | 2/2006 | Okada et al. | |
| 7,070,698 B2 | 7/2006 | Le | |
| 7,100,266 B2 | 9/2006 | Plumer et al. | |
| 7,108,796 B2 | 9/2006 | Bergevin et al. | |
| 7,120,988 B2 | 10/2006 | Le et al. | |
| 7,133,252 B2 | 11/2006 | Takano et al. | |
| 7,139,153 B2 | 11/2006 | Hsiao et al. | |
| 7,185,415 B2 | 3/2007 | Khera et al. | |
| 7,194,798 B2 | 3/2007 | Bonhote et al. | |
| 7,212,379 B2 | 5/2007 | Hsu et al. | |
| 7,251,878 B2 | 8/2007 | Le et al. | |
| 7,253,992 B2 | 8/2007 | Chen et al. | |
| 7,265,942 B2 | 9/2007 | Hixson-Goldsmith et al. | |
| 7,296,337 B2 * | 11/2007 | McFadyen | 29/603.16 |
| 7,296,338 B2 | 11/2007 | Le et al. | |
| 7,324,304 B1 | 1/2008 | Benakli et al. | |
| 7,349,247 B2 | 3/2008 | Saito | |
| 7,369,359 B2 | 5/2008 | Fujita et al. | |
| 7,381,343 B2 | 6/2008 | Gaidis et al. | |
| 7,392,577 B2 | 7/2008 | Yazawa et al. | |
| 7,430,095 B2 | 9/2008 | Benakli et al. | |
| 7,441,325 B2 | 10/2008 | Gao et al. | |
| 7,444,740 B1 | 11/2008 | Chung et al. | |
| 7,464,457 B2 | 12/2008 | Le et al. | |
| 7,469,467 B2 | 12/2008 | Gao et al. | |
| 7,777,987 B2 | 8/2010 | Guan et al. | |
| 7,978,430 B2 * | 7/2011 | Le et al. | 360/125.1 |
| 8,125,732 B2 | 2/2012 | Bai et al. | |
| 8,196,285 B1 | 6/2012 | Zhang et al. | |
| 8,225,488 B1 | 7/2012 | Zhang et al. | |
| 8,254,060 B1 | 8/2012 | Shi et al. | |
| 2002/0093761 A1 | 7/2002 | Payne et al. | |
| 2003/0151850 A1 | 8/2003 | Nakamura et al. | |
| 2004/0061988 A1 | 4/2004 | Matono et al. | |
| 2004/0239320 A1 | 12/2004 | Kobayashi et al. | |
| 2005/0066517 A1 | 3/2005 | Bedell et al. | |
| 2005/0269288 A1 | 12/2005 | Cyrille et al. | |
| 2006/0174474 A1 | 8/2006 | Le | |
| 2006/0198049 A1 | 9/2006 | Sasaki et al. | |
| 2006/0225268 A1 | 10/2006 | Le et al. | |
| 2006/0288565 A1 | 12/2006 | Le et al. | |
| 2007/0113395 A1 | 5/2007 | Dulay et al. | |
| 2007/0137028 A1 | 6/2007 | Carey et al. | |
| 2007/0177301 A1 | 8/2007 | Han et al. | |
| 2007/0188918 A1 | 8/2007 | Im et al. | |
| 2007/0211380 A1 | 9/2007 | Akimoto et al. | |
| 2007/0236834 A1 | 10/2007 | Toma et al. | |
| 2007/0245544 A1 | 10/2007 | Allen et al. | |
| 2007/0247746 A1 | 10/2007 | Kim et al. | |
| 2007/0258167 A1 | 11/2007 | Allen et al. | |
| 2007/0263324 A1 | 11/2007 | Allen et al. | |
| 2007/0283557 A1 | 12/2007 | Chen et al. | |
| 2008/0002293 A1 | 1/2008 | Sasaki et al. | |
| 2008/0002309 A1 | 1/2008 | Hsu et al. | |
| 2008/0110761 A1 | 5/2008 | Lam et al. | |
| 2008/0113514 A1 | 5/2008 | Baer et al. | |
| 2008/0151437 A1 | 6/2008 | Chen et al. | |
| 2008/0297945 A1 | 12/2008 | Han et al. | |
| 2008/0316653 A1 | 12/2008 | Sasaki et al. | |
| 2009/0116145 A1 | 5/2009 | Guan et al. | |
| 2009/0268344 A1 | 10/2009 | Guan et al. | |
| 2009/0279207 A1 | 11/2009 | Sasaki et al. | |
| 2010/0112486 A1 | 5/2010 | Zhang et al. | |
| 2010/0277832 A1 | 11/2010 | Bai et al. | |
| 2011/0222188 A1 | 9/2011 | Etoh et al. | |

OTHER PUBLICATIONS

Notice of Allowance dated Dec. 6, 2011 from U.S. Appl. No. 12/426,134, 22 pages.

\* cited by examiner

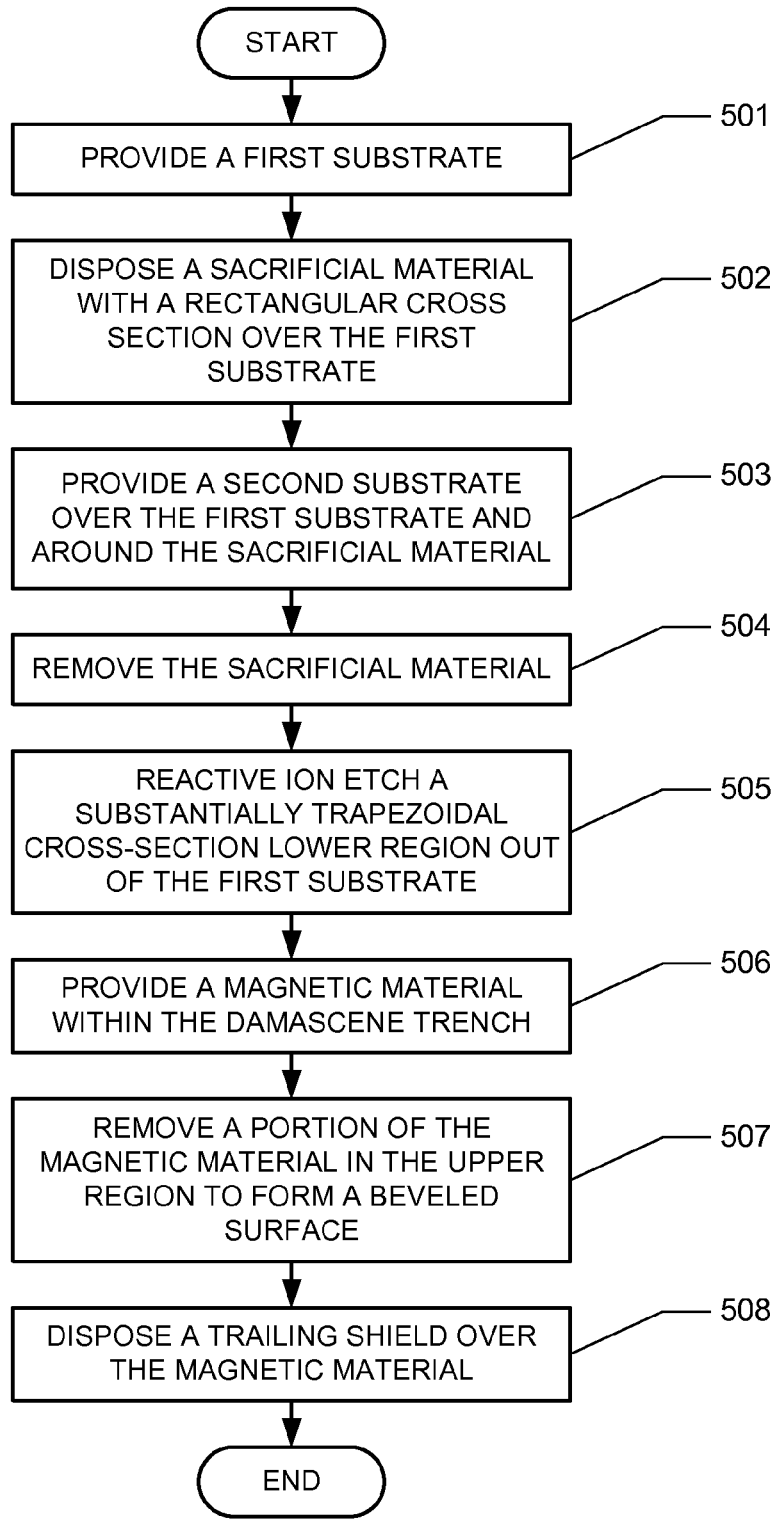

US 8,893,376 B1

METHOD OF FORMING A STRAIGHT TOP MAIN POLE FOR PMR BEVEL WRITER

CROSS REFERENCE TO RELATED APPLICATIONS

This application is a divisional of U.S. patent application Ser. No. 12/426,134, filed on Apr. 17, 2009, now U.S. Pat. No. 8,254,060, which is hereby incorporated by reference in its entirety.

FIELD OF THE INVENTION

The present invention generally relates to hard drives and, in particular, relates to damascene straight top main poles for perpendicular magnetic recording (PMR) bevel writers.

BACKGROUND OF THE INVENTION

Hard disk drives include one or more rigid disks, which are coated with a magnetic recording medium in which data can be stored. Hard disk drives further include read and write heads for interacting with the data in the magnetic recording medium. The write head includes an inductive element for generating a magnetic field that aligns the magnetic moments of domains in the magnetic recording medium to represent bits of data.

Magnetic recording techniques include both longitudinal and perpendicular recording. Perpendicular magnetic recording ("PMR") is a form of magnetic recording in which the magnetic moments representing bits of data are oriented perpendicularly to the surface of the magnetic recording medium, as opposed to longitudinally along a track thereof. PMR enjoys a number of advantages over longitudinal recording, such as significantly higher areal density recording capability.

Some PMR write poles are provided with a bevel near the air bearing surface, which allows the majority of the write pole to have a large thickness while providing a desirable thin pole tip. Unfortunately, in manufacturing trapezoidal write poles with beveled tips, various write pole parameters, such as track width, may be undesirably affected.

SUMMARY OF THE INVENTION

Various embodiments of the present invention solve the foregoing problem by providing a write pole with a bevel that does not affect the track width of the pole. The pole has a cross sectional shape defined by a lower trapezoidal region, and an upper rectangular region, in which upper region the beveled surface intersects the air bearing surface of the pole. This configuration allows for small variations in the position of the beveled surface without any variation in the track width of the write pole.

According to one embodiment of the subject disclosure, a magnetic recording head includes a write pole comprising a throat region. The throat region includes a lower portion having a substantially trapezoidal cross-section, and an upper portion having a substantially rectangular cross-section. In a beveled region of the write pole, the substantially rectangular cross-section of the upper portion decreases in height towards an air bearing surface of the magnetic recording head.

According to another embodiment of the subject disclosure, a method of forming a magnetic recording head comprises the step of forming a damascene trench comprising a lower region having a substantially trapezoidal cross-section and an upper region having a substantially rectangular cross-section. The method further comprises providing a magnetic material within the damascene trench.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 5 is a flow chart illustrating a method of forming a magnetic recording head in accordance with one aspect of the subject disclosure.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1A:
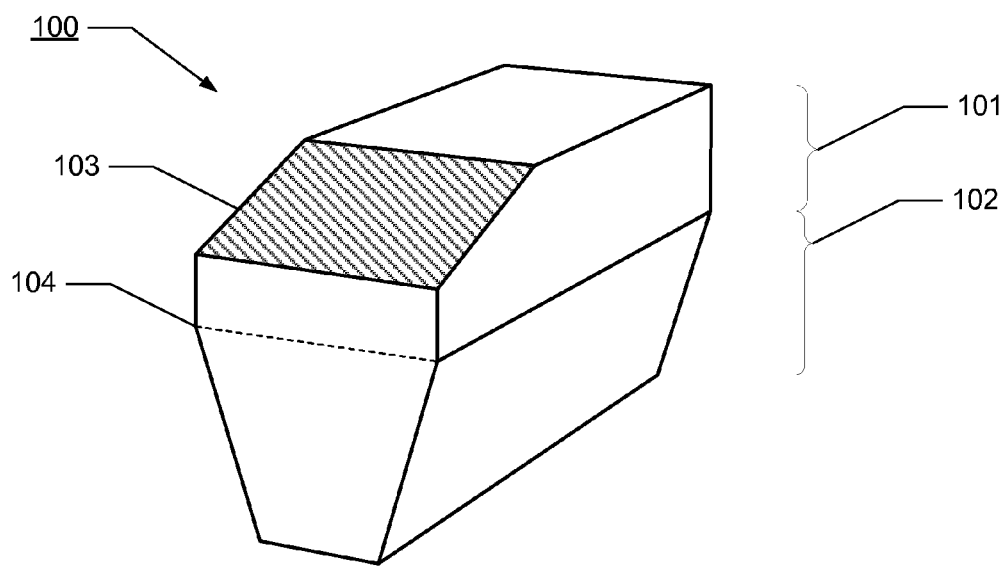
FIG. 1A is a perspective view of a beveled write pole in accordance with one aspect of the subject disclosure.
Figure 1B:
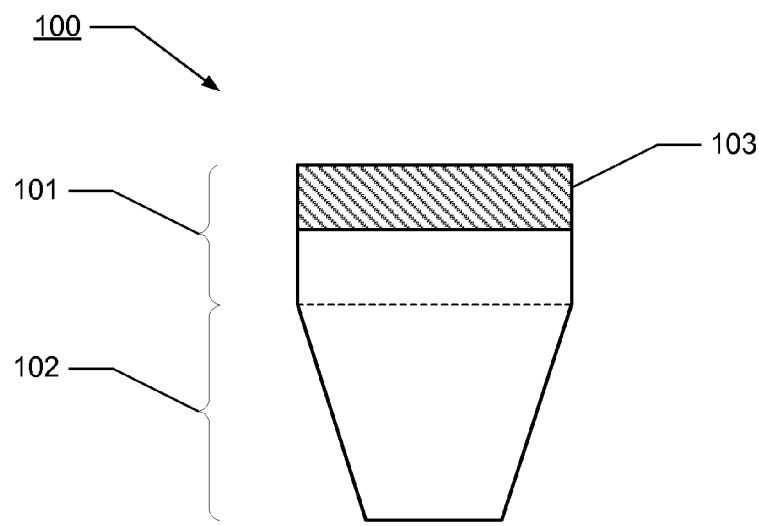
FIG. 1B is a frontal view of a beveled write pole in accordance with one aspect of the subject disclosure.

FIG. 1A is a perspective view of a throat region 100 of a beveled write pole (i.e., main pole) in accordance with one aspect of the subject disclosure. Throat region 100 includes an upper region 101 with a substantially rectangular cross section (e.g., defined by substantially parallel side walls, a trailing edge, and an interface with the lower region). Throat region 100 further includes a lower region 102 with a substantially trapezoidal cross section (e.g., defined by angled side walls, a leading edge, and an interface with upper region 101). The substantially trapezoidal cross-section of lower region 102 is substantially constant along a nose length of the throat region, as is illustrated in exemplary FIG. 1A. Near an air bearing surface 104 of the write pole, throat region 100 includes a substantially planar bevel 103 that intersects air bearing surface 104 within upper region 101. Bevel 103 defines an upper surface of upper region 101 of the throat region 100. The beveled region extends from air bearing surface 104 partway along a nose length of throat region 100. Throat region 100 of the write pole is illustrated from the air bearing surface view in FIG. 1B, in accordance with one aspect of the subject disclosure. As can be seen with reference to FIG. 1B, beveled surface 103 intersects air bearing surface 104 within upper region 101 of the write pole.

A write pole with the foregoing configuration enjoys a number of benefits when compared with other write pole designs. For example, by providing an upper region with substantially parallel side walls, variation in the position of bevel 103 will not impact the track width of the write pole (e.g., as the track width is substantially constant within upper region 101). Bevel 103 may intersect air bearing surface anywhere within upper region 101, or even at an interface between upper region 101 and lower region 102, without negatively affecting the track width of the write pole. As beveled surfaces such as bevel 103 are notoriously difficult to manufacture to the precise tolerances required to reliably maintain a desired track width in write poles with trapezoidal cross-sectional shapes, the foregoing configuration can improve the yield and manufacturing simplicity of hard disk drives incorporating such write poles.

Figure 2A:
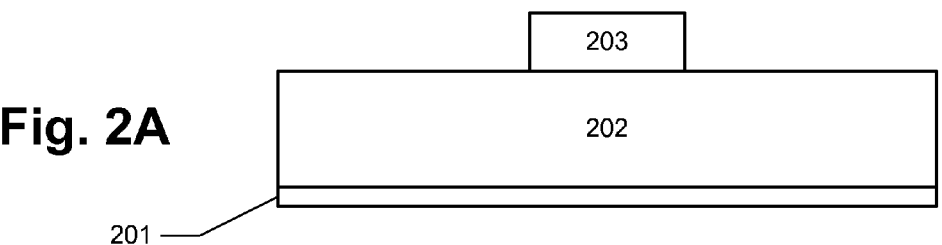
FIGS. 2A to 2H illustrate sequential steps in a method of forming a magnetic recording head in accordance with one aspect of the subject disclosure.
Figure 2B:
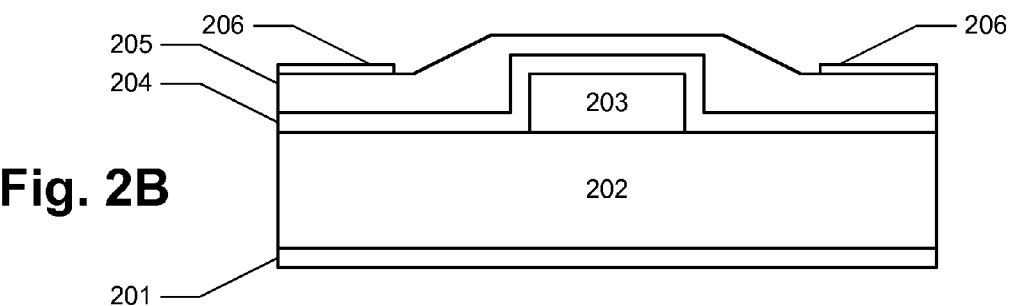
Figure 2C:
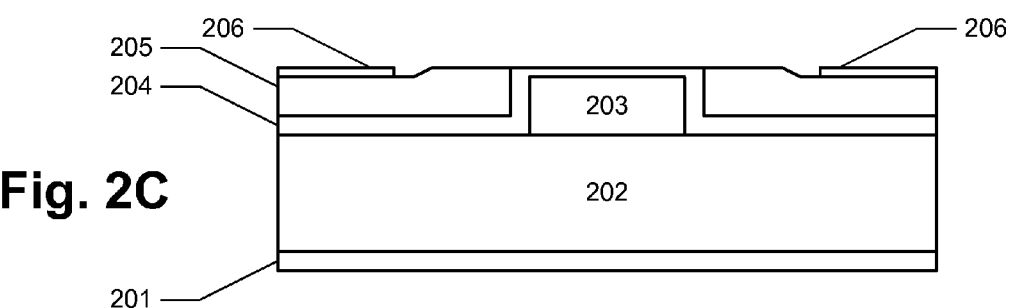
Figure 2D:
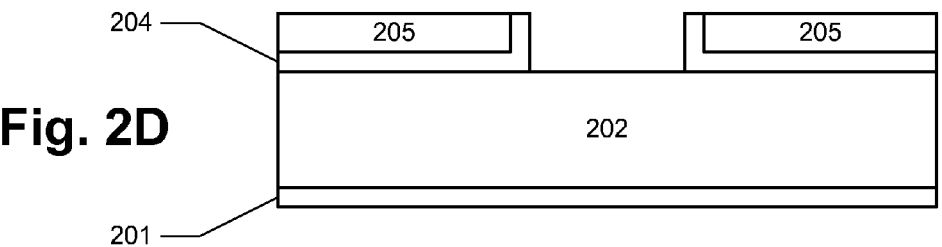

For example, a method of forming a magnetic recording head comprising such a beveled write pole is illustrated in FIGS. 2A to 2H. In FIG. 2A, an RIE stop layer 201 of ruthenium (Ru), nickel-iron (NiFe), chromium (Cr), or the like is overlaid with a substrate 202 of alumina ($Al_2O_3$), on which is disposed a sacrificial material 203 such as photoresist. In FIG. 2B, the photoresist has been covered over with an RIE mask layer 204 of Ru, Cr, NiFe or the like, over which is disposed a second substrate layer 205 of alumina. A CMP stop layer 206 of Ru, tantalum (Ta), Cr, rhodium (Rh) or the like is disposed over second substrate 205, except in regions in which second substrate layer 205 protrudes upwards (e.g., over and around sacrificial material 203). In FIG. 2C, a chemical-mechanical polishing (CMP) step has removed the uppermost regions of second substrate 205 and part of RIE mask layer 204. An ion milling operation is then performed, exposing sacrificial material 203 (and removing CMP stop layer 206 and additional portions of second substrate 205). Sacrificial material 203 may then be removed, either by reactive ion etching (RIE) or by a photo strip process (e.g., if sacrificial material 203 is photoresist), leaving the structure illustrated in FIG. 2D.

Figure 2E:
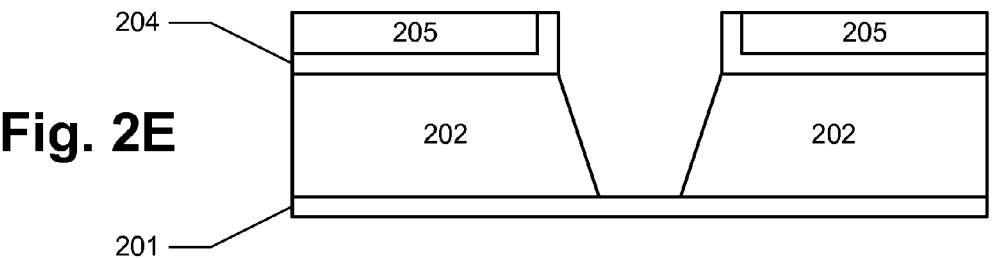
Figure 2F:
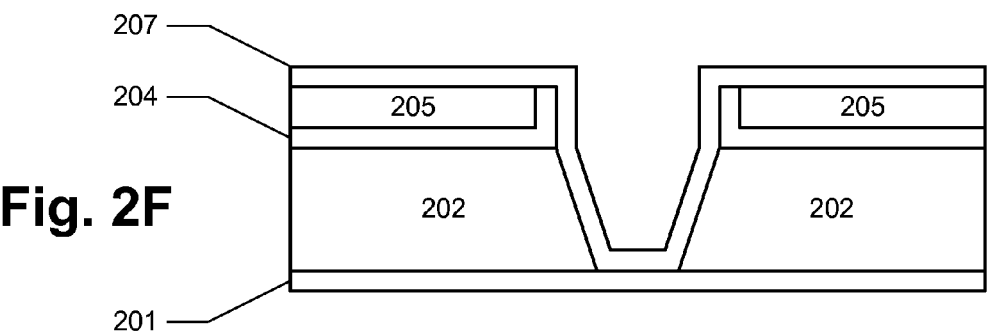
Figure 2G:
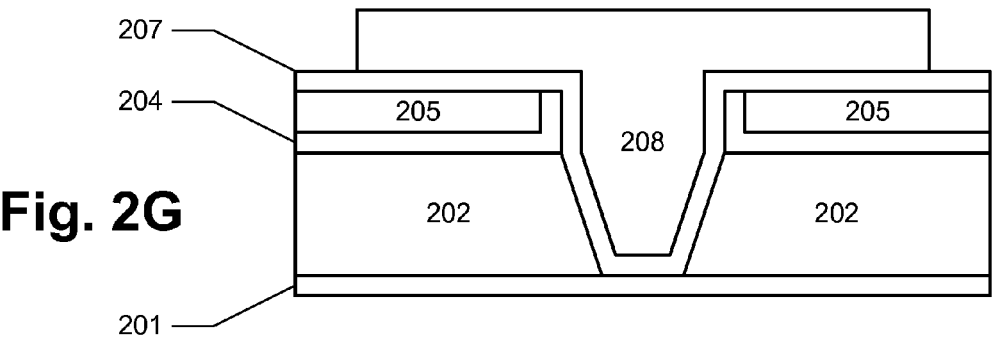
Figure 2H:
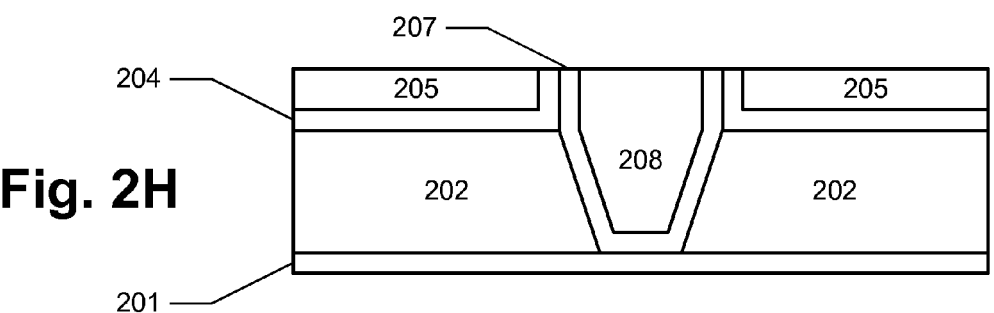

Turning to FIG. 2E, an RIE step forms a damascene trench in first substrate 202 with a substantially trapezoidal cross section. This RIE step may be the same step used to remove sacrificial material 203, or may be a separate step, configured to provide the trapezoidal trench with desired dimensions and/or side wall angles. Turning to FIG. 2F, a plating seed layer/CMP stop layer 207 of Ru, Cr, Rh or the like is deposited over the trench region, and a magnetic material 208 such as CoNiFe, CoFe, NiFe, or the like, is electroplated into the trench, as is shown in FIG. 2G. Another CMP step removes the portion of magnetic material 208 protruding above second substrate 205 and the uppermost portion of CMP stop layer 207, as shown in FIG. 2H. The magnetic material left in the trench forms a write pole, having a lower region with a substantially trapezoidal cross section and an upper region with a substantially rectangular cross section.

Figure 3A:
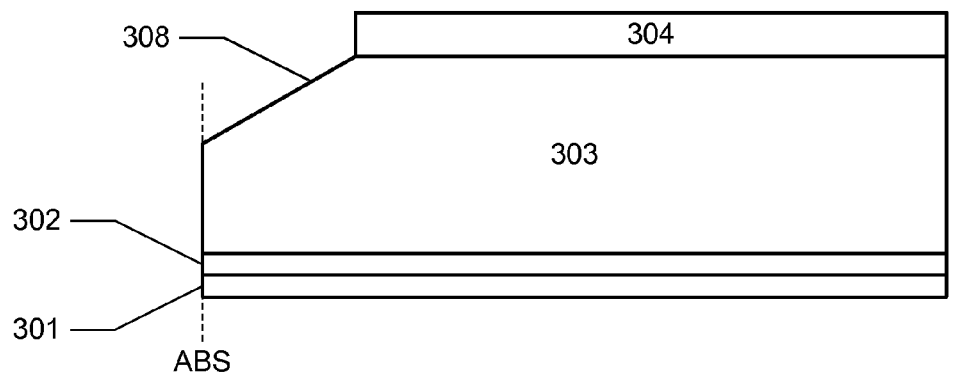
FIGS. 3A and 3B are cross-sectional views of a beveled write pole in accordance with one aspect of the subject disclosure.
Figure 3B:
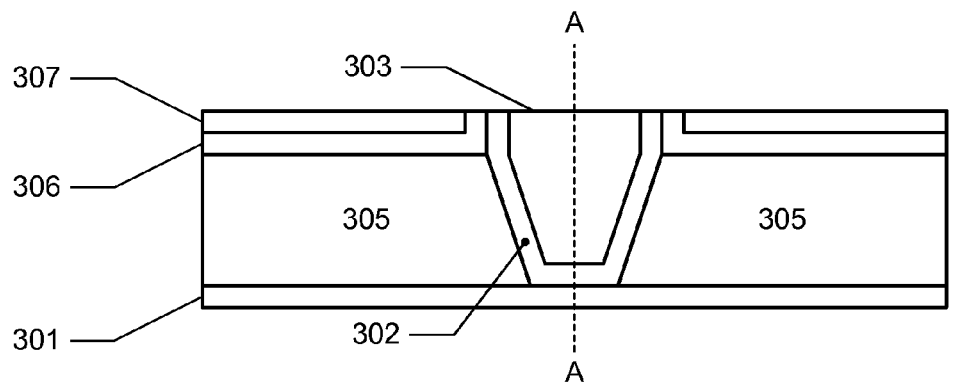

In accordance with one aspect of the subject disclosure, the structure illustrated in FIGS. 2A to 2H may be further processed to form a beveled region near an air bearing surface, as is illustrated in FIGS. 3A and 3B. With reference to exemplary FIGS. 3A and 3B, a beveled main pole 303 is illustrated in cross section, both along axis A-A (FIG. 3A) and at the air bearing surface (FIG. 3B). The head structure comprises an RIE stop layer 301, a side gap layer (e.g., a plating seed layer) 302 and the magnetic material of the main pole 303. The head structure may further comprise side shields 305, and additional layers such as RIE mask layer 306 and second substrate layer 307. By disposing a mask layer 304 over the main pole 303, while leaving uncovered a region near the air bearing surface (ABS), an ion beam etching step may be performed to form a substantially planar bevel 308 that intersects air bearing surface in a region of main pole 303 with substantially parallel side walls.

By providing an upper region of main pole 303 with substantially parallel side walls, variation in the position of bevel 308 will not impact the track width of the write pole (e.g., as the track width is substantially constant within the upper region). Bevel 308 may intersect the air bearing surface anywhere within the upper region, or even at an interface between the upper region and the lower region, without negatively affecting the track width of the write pole.

Figure 4A:
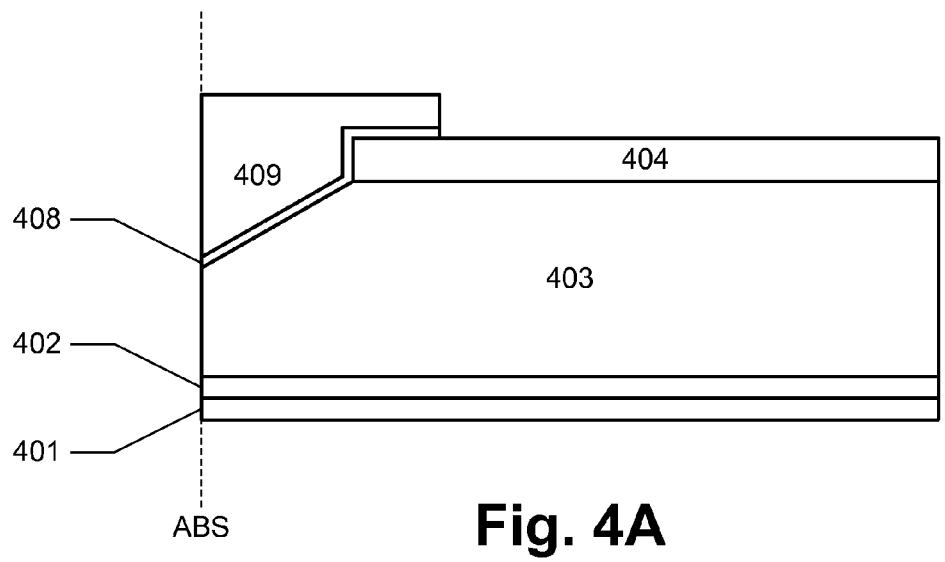
FIGS. 4A and 4B are cross-sectional views of a beveled write pole in accordance with one aspect of the subject disclosure.
Figure 4B:
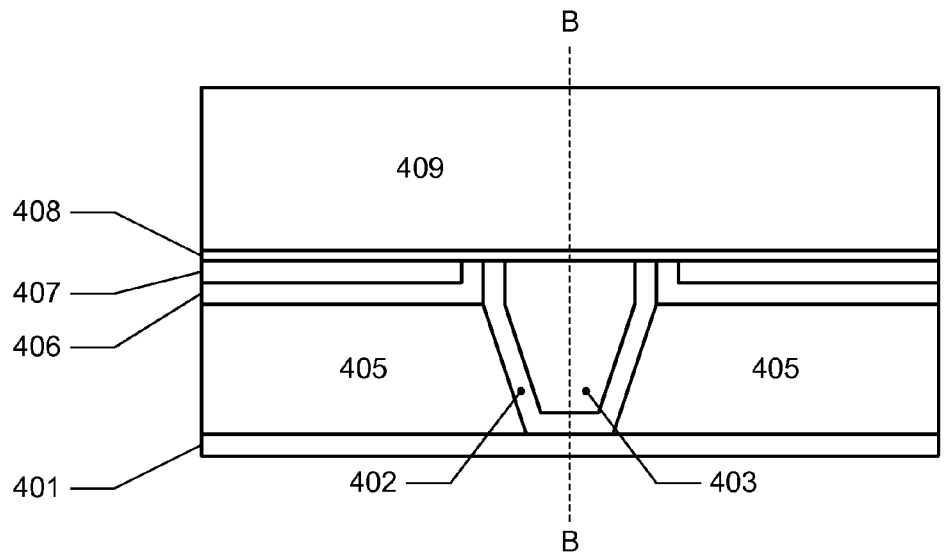

In accordance with one aspect of the subject disclosure, the structure illustrated in FIGS. 3A and 3B may be further processed to provide a trailing shield thereon, conform with the beveled surface thereof, as is illustrated in FIGS. 4A and 4B. With reference to exemplary FIGS. 4A and 4B, a beveled main pole 403 with a trailing shield 409 is illustrated in cross section, both along axis B-B (FIG. 4A) and at the air bearing surface (FIG. 4B). The head structure comprises an RIE stop layer 401, a side gap layer (e.g., a plating seed layer) 402 and the magnetic material of the main pole 403. The head structure may further comprise side shields 405, and additional layers such as RIE mask layer 406, second substrate layer 407, and a beveling mask layer 404. The head structure may further comprise a write gap layer 408 of $Al_2O_3$, Ru, Rh, or the like disposed over main pole 403 and a conformal trailing shield 409 of NiFe, CoNiFe or the like disposed over write gap layer 408, near the air bearing surface (ABS) of the head.

FIG. 5 is a flow chart illustrating a method of forming a magnetic recording head in accordance with one aspect of the subject disclosure. The method begins with steps 501 to 505, in which is formed a damascene trench comprising a lower region having a substantially trapezoidal cross-section and an upper region having a substantially rectangular cross-section. In particular, in step 501, a first substrate (e.g., of alumina) is provided. In step 502, a sacrificial material (e.g., photoresist) is provided over the first substrate, the sacrificial material having a substantially rectangular cross-sectional shape. In step 503, as second substrate (e.g., alumina) is provided over the first substrate and surrounding the sacrificial material. In step 504, the sacrificial material is removed (e.g., via RIE, wet etching, photo stripping, or the like). In step 505, the lower substrate exposed by removing the sacrificial material is subjected to a reactive ion etching, to form a damascene trench therein with a substantially trapezoidal cross-sectional shape. In step 506, a magnetic material is provided (e.g., via electroplating) within the trench formed in steps 501 to 505. In step 507, a portion of the magnetic material in the upper region (with the substantially rectangular cross-section) may be removed (e.g., via ion beam etching) to form a beveled surface near an air bearing surface of the magnetic recording head. In step 508, a trailing shield may be disposed over the magnetic material in the upper region (with the substantially rectangular cross-section) near an air bearing surface of the magnetic recording head.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method of forming a magnetic recording head, comprising:
    forming a damascene trench comprising a lower region having a trapezoidal cross-section and an upper region having a rectangular cross-section;
    providing a magnetic material within the damascene trench, wherein the magnetic material forms a throat region extending to an air bearing surface of the magnetic recording head, the throat region comprising:
        a lower portion having a trapezoidal cross-section at the air bearing surface; and
        an upper portion having a rectangular cross-section at the air bearing surface; and
    removing a portion of the magnetic material in the upper portion to form a beveled surface such that the beveled surface is confined in the upper portion.

2. The method according to claim 1, wherein the beveled surface extends from the air bearing surface of the magnetic recording head partway along the throat region of the magnetic recording head.

3. The method according to claim 1, wherein the removing the portion of the magnetic material comprises ion beam etching.

4. The method according to claim 1, further comprising:
    disposing a trailing shield over the magnetic material in the upper region of the trench near the air bearing surface of the magnetic recording head.

5. The method according to claim 1, wherein the trapezoidal cross-section of the lower portion is substantially constant along the throat region of the magnetic recording head.

6. The method according to claim 1, wherein the upper portion comprises substantially parallel side walls.

7. The method according to claim 1, wherein the forming the damascene trench comprises:
    providing a first substrate;
    disposing a sacrificial material in the shape of the upper region over the first substrate;
    providing a second substrate over the first substrate and around the sacrificial material;
    removing the sacrificial material; and
    reactive ion etching the lower region out of the first substrate.

8. The method according to claim 7, wherein the first and second substrates are alumina.

9. The method according to claim 7, wherein the sacrificial material is photoresist.

10. The method according to claim 1, wherein the magnetic material is provided within the damascene trench via electroplating.

* * * * *